(12) United States Patent
Batarseh et al.

(10) Patent No.: US 10,968,704 B2
(45) Date of Patent: Apr. 6, 2021

(54) IN-SITU LASER GENERATOR COOLING SYSTEM FOR DOWNHOLE APPLICATION AND STIMULATIONS

(71) Applicant: Saudi Arabian Oil Company, Dhahran (SA)

(72) Inventors: Sameeh Issa Batarseh, Dhahran (SA); Mohamed Nabil Noui-Mehidi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 15/902,702

(22) Filed: Feb. 22, 2018

(65) Prior Publication Data

US 2019/0257156 A1 Aug. 22, 2019

(51) Int. Cl.
*E21B 7/15* (2006.01)
*H01S 3/00* (2006.01)
*B23K 26/03* (2006.01)
*B23K 26/38* (2014.01)
*E21B 43/11* (2006.01)

(52) U.S. Cl.
CPC .............. *E21B 7/15* (2013.01); *B23K 26/032* (2013.01); *B23K 26/38* (2013.01); *E21B 43/11* (2013.01); *H01S 3/0071* (2013.01)

(58) Field of Classification Search
CPC ................................ E21B 7/15; H01S 3/0071
See application file for complete search history.

(56) References Cited

U.S. PATENT DOCUMENTS

| | | | |
|---|---|---|---|
| 4,090,572 A | 5/1978 | Welch | |
| 4,125,757 A | 11/1978 | Ross | |
| 6,622,540 B2 | 9/2003 | Jones et al. | |
| 6,755,262 B2 | 6/2004 | Parker | |
| 8,153,928 B2 | 4/2012 | Aubert et al. | |
| 9,689,608 B2 | 6/2017 | Beeler | |
| 10,006,821 B1* | 6/2018 | Boger | G01L 1/24 |
| 10,151,515 B2* | 12/2018 | Chen | F25B 9/04 |
| 2004/0219056 A1 | 11/2004 | Tribelsky et al. | |
| 2005/0257533 A1 | 11/2005 | Gunawardana et al. | |
| 2010/0326659 A1 | 12/2010 | Schultz et al. | |

(Continued)

FOREIGN PATENT DOCUMENTS

| | | |
|---|---|---|
| CN | 203081295 U | 7/2013 |
| CN | 203334954 U | 12/2013 |

(Continued)

OTHER PUBLICATIONS

The International Search Report and Written Opinion for related PCT application PCT/US2019/019122 dated Jun. 6, 2019.

*Primary Examiner* — Taras P Bemko
*Assistant Examiner* — Yanick A Akaragwe
(74) *Attorney, Agent, or Firm* — Bracewell LLP; Constance G. Rhebergen; Linda L. Morgan (57) ABSTRACT

Systems and methods for penetrating a subterranean formation with a downhole laser assembly include a laser generation unit located within a subterranean well. The downhole laser assembly further includes a vortex tube. The vortex tube has a compressed air supply port, a hot air outlet oriented to direct a hot air stream in a direction away from the laser generation unit, and a cold air outlet oriented to direct a cold air stream over the laser generation unit.

14 Claims, 5 Drawing Sheets

(56) References Cited

U.S. PATENT DOCUMENTS

| | | |
|---|---|---|
| 2012/0248078 A1 | 10/2012 | Zediker et al. |
| 2014/0174734 A1* | 6/2014 | Gill ........................ E21B 43/38 166/265 |
| 2014/0182933 A1 | 7/2014 | Skinner et al. |
| 2014/0246129 A1 | 9/2014 | Amtmann et al. |
| 2014/0360778 A1* | 12/2014 | Batarseh ................... E21B 7/15 175/17 |
| 2016/0149369 A1 | 5/2016 | Monty et al. |
| 2016/0341020 A1* | 11/2016 | Al-Buraik ............. E21B 47/065 |

FOREIGN PATENT DOCUMENTS

| | | |
|---|---|---|
| CN | 205163242 U | 4/2016 |
| WO | 2015095155 A1 | 6/2015 |

* cited by examiner

IN-SITU LASER GENERATOR COOLING SYSTEM FOR DOWNHOLE APPLICATION AND STIMULATIONS

BACKGROUND OF THE DISCLOSURE

1. Field of the Disclosure

The present disclosure relates to operations in a wellbore associated with the production of hydrocarbons. More specifically, the disclosure relates to systems and methods for enhancing flow from a targeted hydrocarbon formation by creating a penetration through a region adjacent to the wellbore.

2. Description of the Related Art

The branch of petroleum engineering called wellbore stimulation includes the task of enhancing flow of production fluids from a hydrocarbon formation to the wellbore. To produce hydrocarbons from the targeted hydrocarbon formation, the hydrocarbon in the formation needs to be in communication with the wellbore. The flow from the hydrocarbon formation to the wellbore is carried out by the means of formation permeability. In tight formations when such permeability is low, stimulation can be applied around the wellbore and into the formation to enhance the flow and build a network of communication lines between the hydrocarbon formation and the wellbore.

A current method to perforate well casing is with the use of a shaped charge. Shaped charges are lowered into the wellbore to the target release zone. The release of the shaped charge creates short tunnels that penetrate the steel casing, the cement and into the formation.

The use of shaped charges has several disadvantages. For example, shaped charges produce a compact zone around the tunnel that reduces permeability and therefore production. The high velocity impact of a shaped charge crushes the rock formation and produces very fine particles that plug the pore throat of the formation reducing flow and production. There is the potential for melt to form in the tunnel. There is no control over the geometry and direction of the tunnels created by the shaped charges. There are limits on the penetration depth and diameter of the tunnels. There is a risk to people involved while handling the explosives at the surface.

A method of initiating a network of communication between the hydrocarbon formation and the wellbore is by pumping fluids through an isolated downhole device in the wellbore. The fluid is pumped at a high rate such that the pressure exceeds the formation breaking pressure and causes the hydrocarbon formation and surrounding rocks to break and become fractured. This procedure is called hydraulic fracturing and is carried out mostly using a water based fluid called hydraulic fracture fluid. Hydraulic fracturing produces fractures in the hydrocarbon formation and creates networking between the hydrocarbon formation and the wellbore. However, hydraulic fracturing usually requires the use of an isolation device as well as rig intervention. There is very little control over the direction of the fracture and no control of where and when these fractures will be created. In addition, hydraulic fracturing can be damaging to the formation. As an example, successful hydraulic fracturing requires careful engineering designs and skills and if the hydraulic fracturing operation is not properly designed, the resulting fractures can propagate in the undesired orientation and might connect the fresh water with reservoir water. In addition, using polymers and other chemicals with the fracturing fluid can damage the formation especially in unconventional and shale formation. In regions with water shortages, obtaining the millions of gallons of water required for hydraulic fracturing presents a challenge. There are environmental concerns regarding the components added to hydraulic fracturing fluids that create an overall use and disposal problem for the fluid.

SUMMARY OF THE DISCLOSURE

Embodiments of this disclosure provide non-damaging systems and methods for establishing communications between the wellbore and subterranean formation to improve production by utilizing in-situ laser generator and cooling system. A high power laser is provided within the subterranean well to avoid conveying the laser energy from the surface to the target downhole. Having a laser generation unit located at the surface and conveying the laser energy into the subterranean well with a fiber optics cable results in power loss and heating in the cable due to the high energy level transmitting through the cable.

High power laser energy provides non-damaging alternative technology for downhole stimulations to improve production. The temperature within the subterranean well increases naturally with depth. A vortex tube is supplied with compressed air to cool the laser generation unit within the subterranean well so that the temperature of the laser generation unit does not exceed 21 degrees Celsius (° C.).

In an embodiment of this disclosure, a downhole laser assembly for penetrating a subterranean formation includes a laser generation unit located within a subterranean well. The downhole laser assembly further includes a vortex tube. The vortex tube has a compressed air supply port, a hot air outlet oriented to direct a hot air stream in a direction away from the laser generation unit, and a cold air outlet oriented to direct a cold air stream over the laser generation unit.

In alternate embodiments, the vortex tube can further include a swirl chamber shaped to accelerate a compressed air supply into a vortex flow pattern. The vortex tube can be located within the subterranean well.

In other alternate embodiments, the laser generation unit can include an excitation mechanism positioned to excite an active medium. The laser generation unit can further include an optical resonator, the optical resonator including a reflectance mirror located at a first end of the active medium and an output coupler mirror located at a second end of the active medium. The reflectance mirror can be located uphole from the output coupler mirror.

In yet other alternate embodiments, the downhole laser assembly can further include a laser manipulator having a laser collimator, the laser manipulator positioned to receive a raw laser beam from the laser generation unit through the laser collimator to produce a collimated laser beam. The laser manipulator can further include a beam splitter positioned to split the collimated laser beam. The laser manipulator can alternately further include a beam redirector positioned in the path of the collimated laser beam, the beam redirector operable to change the direction of the collimated laser beam, producing a redirected laser beam, and a rotational system positioned to rotate the redirected laser beam around an axis of the collimated laser beam.

In an alternate embodiment of this disclosure, a method for penetrating a subterranean formation with a downhole laser assembly includes generating a raw laser beam with a laser generation unit located within a subterranean well. A compressed air supply can be provided to a compressed air supply port of a vortex tube. A hot air stream can be directed in a direction away from the laser generation unit with a hot air outlet the vortex tube. A cold air stream can be directed over the laser generation unit with a cold air outlet of the vortex tube.

In alternate embodiments, the compressed air supply can be accelerated into a vortex flow pattern with a swirl chamber of the vortex tube. The vortex tube can be located within the subterranean well.

In other alternate embodiments, generating a raw laser beam can include exciting an active medium of the laser generation unit with an excitation mechanism of the laser generation unit. Alternately, generating a raw laser beam can include reflecting a laser light with an optical resonator, the optical resonator including a reflectance mirror located at a first end of the active medium and an output coupler mirror located at a second end of the active medium. The reflectance mirror can be located uphole from the output coupler mirror.

In yet other alternate embodiments, a collimated laser beam can be produced with a laser manipulator having a laser collimator, the laser manipulator positioned to receive the raw laser beam from the laser generation unit through the laser collimator. The collimated laser beam can be split with a beam splitter of the laser manipulator. A redirected laser beam can be produced by changing the direction of the collimated laser beam with a beam redirector of the laser manipulator positioned in the path of the collimated laser beam. The redirected laser beam can be rotated around an axis of the collimated laser beam with a rotational system of the laser manipulator.

BRIEF DESCRIPTION OF THE DRAWINGS

So that the manner in which the previously-recited features, aspects and advantages of the embodiments of this disclosure, as well as others that will become apparent, are attained and can be understood in detail, a more particular description of the disclosure briefly summarized previously may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
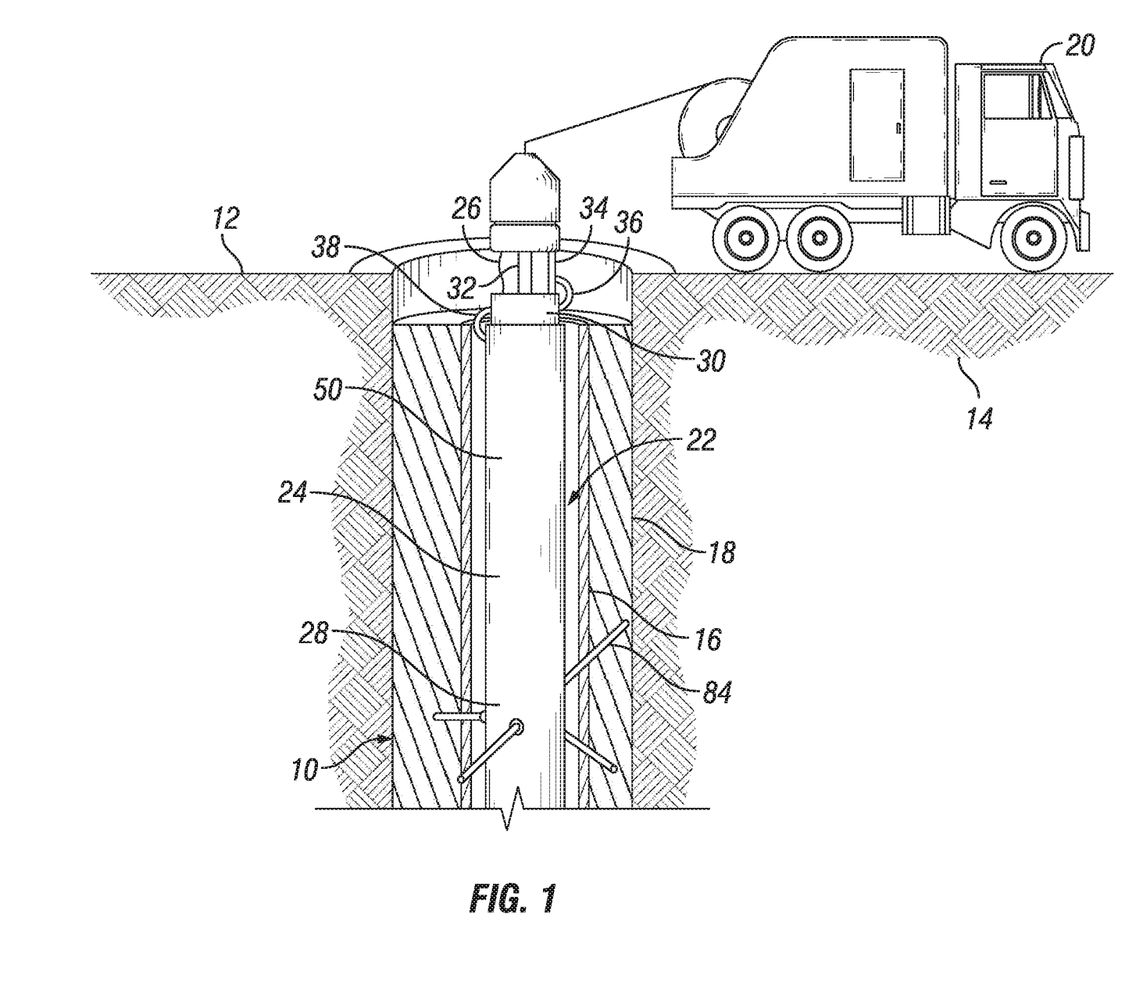
FIG. 1 is a schematic partial section view of a subterranean well with a downhole laser assembly in accordance with an embodiment of the disclosure.

Looking at FIG. 1, subterranean well 10 extends from surface 12 and through subterranean formation 14. Surface 12 is shown as an earth's surface. In alternate embodiments, surface 12 can be a seabed. Subterranean well 10 can be used for hydrocarbon development operations. As an example, subterranean well 10 can be used for producing hydrocarbons or water from subterranean formation 14 or for injecting fluids, such as water, into subterranean formation 14. Subterranean formation 14 can be, for example, a hydrocarbon bearing formation.

Subterranean well 10 can be lined with casing 16 which is surrounded by cement 18. In alternate embodiments, subterranean well 10 can be an uncased or open hole. Subterranean well 10 is shown as extending generally vertically from surface 12. In alternate embodiments, subterranean well 10 can include sections that are deviated, inclined from vertical or are generally horizontal relative to surface 12.

Surface unit 20 can be located at surface 12 proximate to subterranean well 10. Surface unit 20 can provide power, operating fluids, and support to downhole laser assembly 22. Downhole laser assembly 22 includes laser generation unit 24, which is located within subterranean well 10. Power supply required to operate laser generation unit can be provided by surface unit 20 by way of power cable 26. Laser generation unit 24 can generate a laser that is capable of penetrating through casing 16, cement 18 and into subterranean formation 14, as more specifically described in this disclosure, to form, for example, holes or tunnels in and between the bore of casing 16 and subterranean formation 14. Laser manipulator 28 can direct a laser beam that is generated by laser generation unit 24 into subterranean formation 14.

Downhole laser assembly 22 further includes vortex tube 30. Vortex tube 30 can be supplied with compressed air by way of compressed air supply line 32 that extends from surface unit 20 to vortex tube 30. Vortex tube 30 can direct hot air in a direction away from laser generation unit 24 with hot air exhaust line 34 that is in fluid communication with hot air outlet 36 of vortex tube 30. Hot air outlet 36 and associated lines can be formed of a material that can withstand temperatures up to 200° C., such as, for example, an advanced ceramic, alumina, zironia, or silicon nitride. Vortex tube 30 can direct cold air over laser generation unit 24 with cold air outlet 38. In order to avoid the formation of methyl hydrates around cold air outlet 38 or the adherence of asphaltenes and paraffins that could fall out of solution, cold air outlet 38 and associated lines can be enclosed so that they are not exposed to the gases and other materials donwhole.

Figure 2:
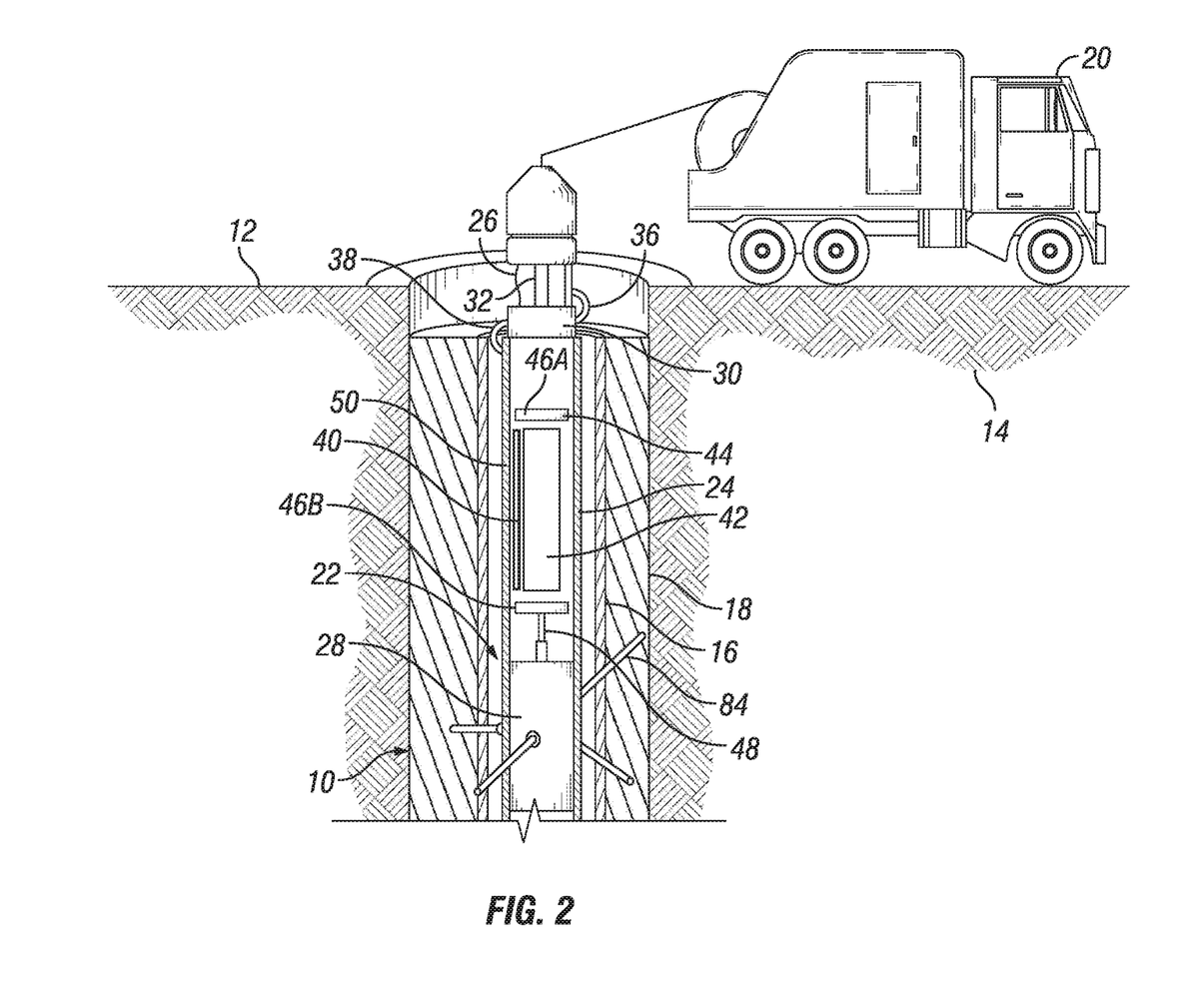
FIG. 2 is a schematic partial section view of a subterranean well with a downhole laser assembly in accordance with an embodiment of the disclosure, showing components of the laser generation unit.
Figure 3:
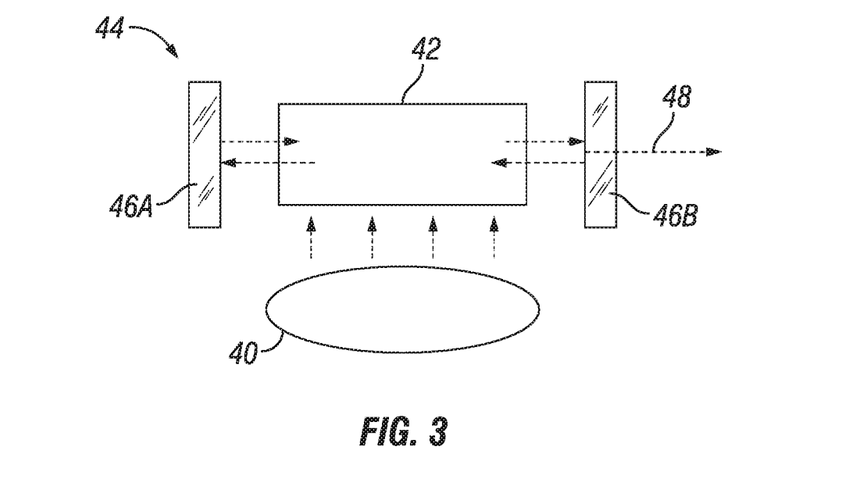
FIG. 3 is schematic representation of the components of the laser generation unit, in accordance with an embodiment of the disclosure.

Looking at FIGS. 2-3, laser generation unit 24 can include excitation mechanism 40 positioned to excite active medium 42. Both excitation mechanism 40 and active medium 42 can be elongated members that are sized to fit within the bore of subterranean well 10.

Active medium 42 can contain the lasing atoms that produce laser light and can be a solid crystal, a gas, a semiconductor junction, or a liquid. Excitation mechanism 40 can provide energy to the electrons of active medium 42 and transfer the atoms of active medium 42 into an excited state, in which they may then spontaneously radiate the absorbed energy by spontaneous emission. The electron can drop back to its original orbit (known as the ground state) or can remain at an intermediate level. If the electron absorbs another quantum of energy while the atom is in the excited state, two quanta of energy are radiated, and the electron drops to its original level, which is known as stimulated emission. The stimulated or radiated energy has the same wavelength as that of the stimulating energy. As a result, the stimulating energy is amplified. Excitation mechanism can be, for example, a diode laser source or electrical excitation.

Laser generation unit 24 also includes optical resonator 44 that has reflectance mirror 46A located proximate to a first end of active medium 42 and output coupler mirror 46B located proximate to a second end of active medium 42. Reflectance mirror 46A and output coupler mirror 46B are aligned to reflect the laser light back and forth, coupling through active medium 42. Reflectance mirror 46A can have a reflectivity of 99-100 percent (%) so that all or almost all of the laser light is reflected by reflectance mirror 46A. Output coupler mirror 46B has a lower reflectance and allows some of the laser light to pass through to form raw laser beam 48. In an example embodiment, 80-90% of the laser light can pass through coupler mirror 46B.

The components of laser generation unit 24 can be housed within laser housing 50 that is sized to be lowered within the bore of subterranean well 10, such as within an inner bore of casing 16. Laser housing 50 can be an elongated member. In example embodiments, laser housing 50 can have an outer diameter of three to five inches and a length of four to six feet. In an alternate example embodiment, laser housing 50 can have an outer diameter of four inches and a length of five feet.

Active medium 42 and excitation mechanism 40 work together with optical resonator 44 to form an amplified optical laser. Laser light entering one end of optical resonator 44 will be amplified by stimulated emission as it travels through the active medium 42. In an example embodiment, laser generation unit 24 can produce a high power laser beam with a power in the range of one to ten kilowatts and with a wavelength that can be determined by person having ordinary skill in the art, as necessary to penetrate subterranean formation 14 to the desired penetration depth.

Desired penetration depth can be a desired tunnel depth, tunnel length, or tunnel diameter. Desired penetration depth is determined by intended use of subterranean well 10 and properties of subterranean formation 14 such as geological material or rock type, rock maximum horizontal stress, or the compressive strength of the rock. In certain embodiments the desired penetration depth can be greater than six inches into subterranean formation 14, and can include depths of one, two, three or more feet. In order to achieve the desired penetration depth, laser generation unit 24 can operate with a cycling mode such that laser generation unit 24 cycles between on periods and off periods. Alternately, laser generation unit 24 can operate in a continuous mode.

Reflectance mirror 46A is located uphole from output coupler mirror 46B so that raw laser beam 48 is directed generally downhole when passing through output coupler mirror 46B. Laser manipulator 28 can be used to collimate, split, and direct a laser beam into subterranean formation 14. Looking at FIGS. 4-5, raw laser beam 48 can be coupled into fiber optics cable 52 to control and direct the beam. Fiber optics cable 52 can be of a graded index fiber in order to improve beam quality.

Figure 4:
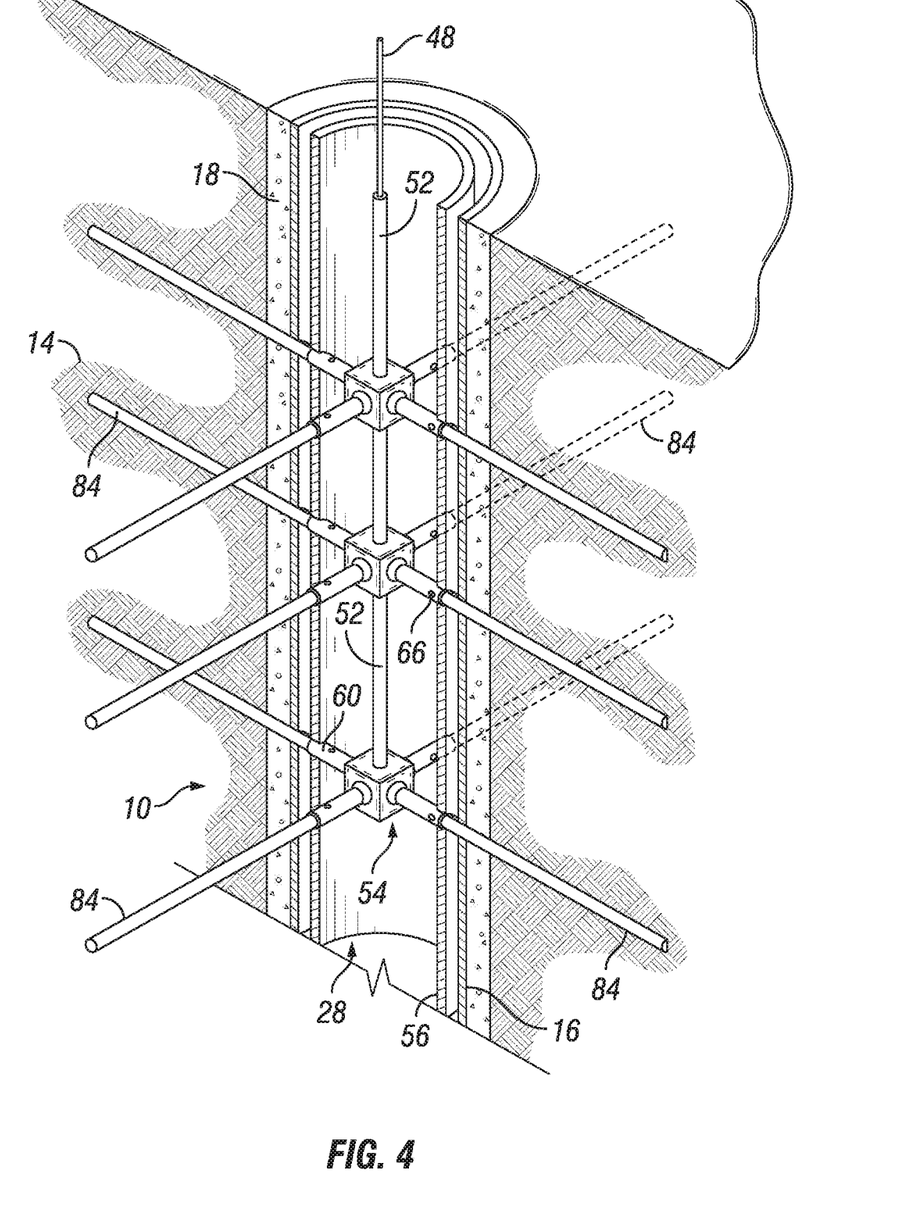
FIG. 4 is a partial section view of a rotational system of a downhole laser assembly, in accordance with an embodiment of the disclosure.
Figure 5:
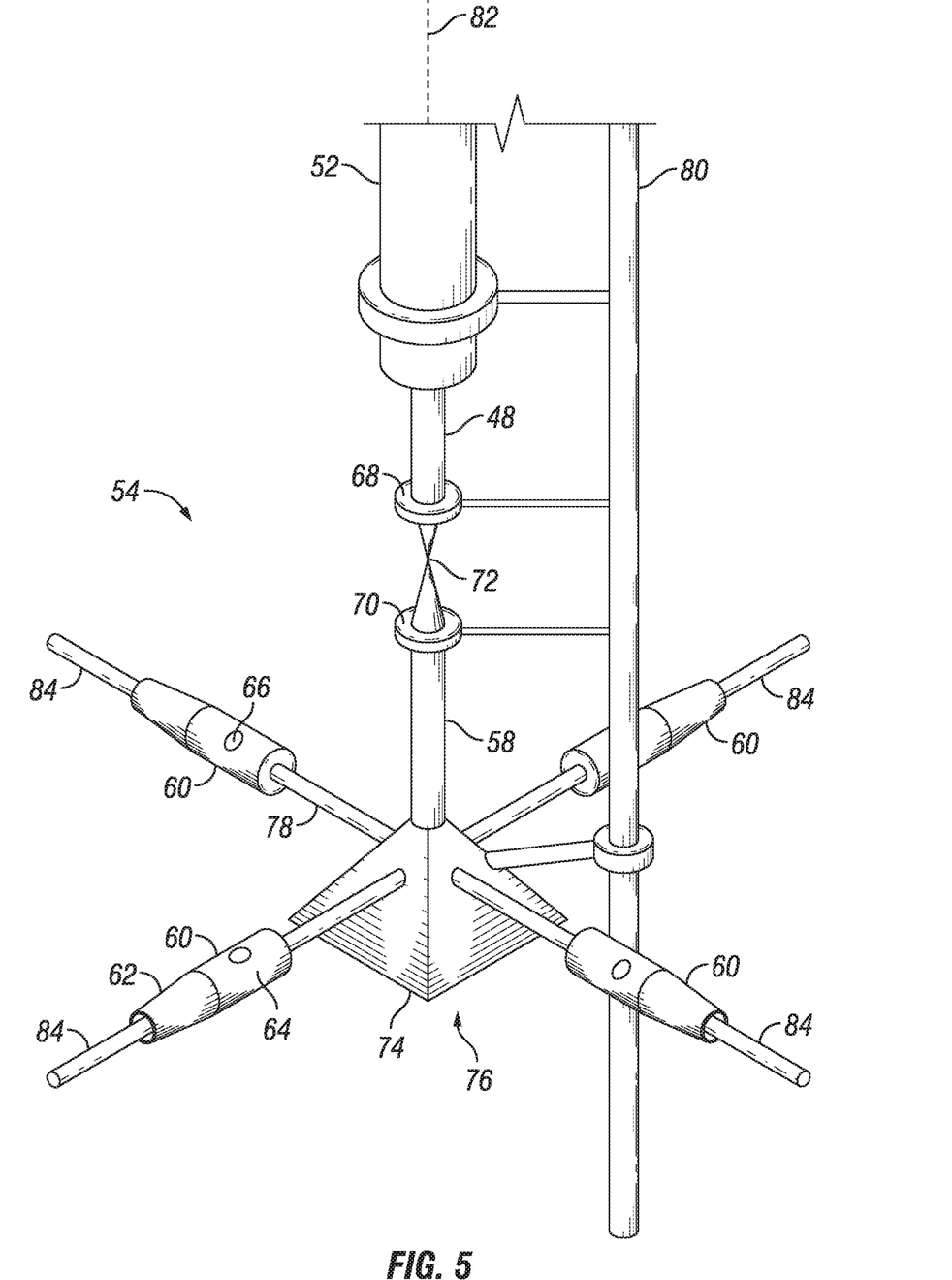
FIG. 5 is a perspective view of a laser manipulator of a downhole laser assembly, in accordance with an embodiment of the disclosure.

Laser manipulator 28 includes one or more manipulator units 54. Each manipulator unit 54 can be spaced apart from adjacent manipulator units 54 within manipulator housing 56. Fiber optics cable 52 can extend between each manipulator unit 54 for conveying a laser beam between manipulator units 54. Each manipulator unit 54 can deliver one or more redirected laser beams out of manipulator housing 56 through laser head 60.

Laser head 60 can taper such that the laser head 60 has a frusto conical shaped end with a tip 62 that has a smaller inner diameter and outer diameter than base 64. The tapering of tip 62 prevents vapor from entering laser manipulator 28 through laser head 60. The vapor may include dust and other particulate matter.

Laser head 60 can also include temperature sensor 66. Temperature sensor 66 monitors the temperature of laser head 60. The data collected by temperature sensor 66 can be used to protect downhole laser assembly 22 from overheating or can monitor the intensity of the laser beam to allow for adjustments.

Looking at FIG. 5, inside of each manipulator housing 56 of manipulator unit 54 is focusing lens 68 and laser collimator 70. Focusing lens 68 and laser collimator 70 of laser manipulator 28 are positioned to receive raw laser beam 48. Focusing lens 68 can focus the laser beam with a focal point 72. The beam can then pass through laser collimator 70 to produce collimated laser beam 58.

Beam splitter 74 can be positioned within manipulator housing 56 to split collimated laser beam 58 into two or more laser beams. Beam splitter 74 can include any device capable of splitting a single laser beam into multiple laser beams. Beam splitter 74 can include, for example, a prism. Beam splitter 74 can be selected to split a single laser beam into two, three, four, or more laser beams depending on the requirements of the application.

Manipulator unit 54 can further include beam redirector 76 positioned in the path of collimated laser beam 58. Beam redirector 76 is operable to change the direction of collimated laser beam 58, producing a redirected laser beam 78 of collimated laser beam 58. In the example of FIG. 5, beam splitter 74 is a prism that is also beam redirector 76 and can change the direction and angle in three-dimensional space of a laser beam. Fiber optics cable 52, focusing lens 68, laser collimator 70, and beam splitter 74 and beam redirector 76 can each be structurally supported by support member 80 within manipulator unit 54. Each manipulator unit 54 is rotatable about fiber optics cable 52 so that each manipulator unit 54 acts as a rotational system positioned to rotate redirected laser beam 78 around an axis 82 of fiber optics cable 52, or an axis of collimated laser beam 58.

In this way, manipulator unit 54 receives raw laser beam 48 and produces a collimated and redirected laser beam, shown as resulting laser beam 84 that passes out of manipulator unit 54 through laser head 60.

Because embodiments of this disclosure provide systems and methods that excite the electron and produce photons downhole, a downhole cooling system of vortex tube 30 is provided to cool the components of laser generation unit 24. Looking at FIG. 6, vortex tube 30 is a stationary and non-rotating mechanical device that separates compressed air supply 86 into hot air stream 88 and cold air stream 90. In alternate embodiments, a different gas can be used instead of air such as, for example, helium, nitrogen, carbon dioxide or oxygen, or combinations thereof. Hot air stream 88 emerging from hot air outlet 36 can, as an example, reach temperatures of up to 200° C. Cold air stream 90 emerging from cold air outlet 38 can, as an example, reach temperatures of down to −50° C.

Figure 6:
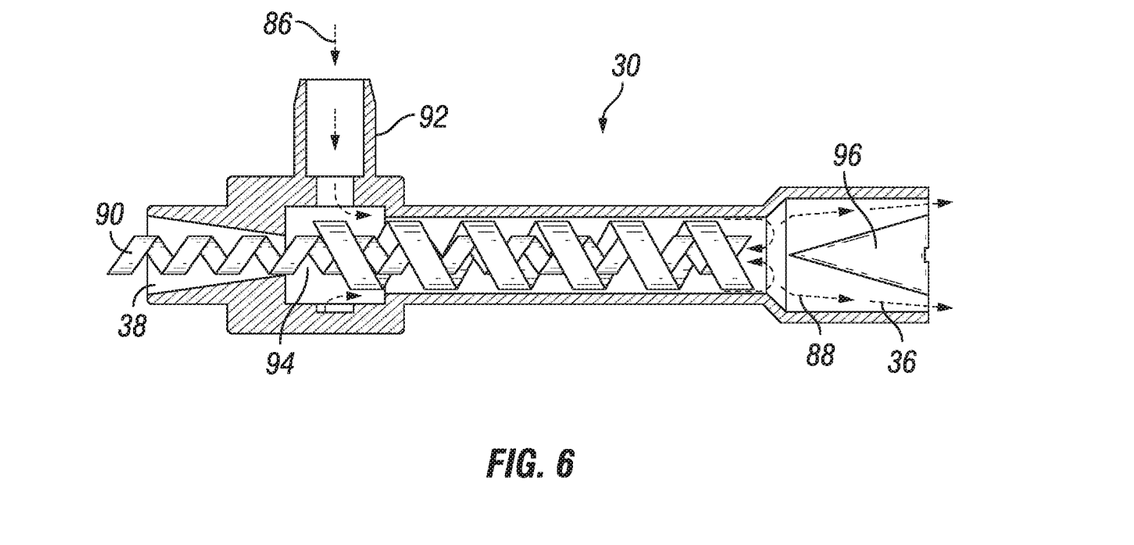
FIG. 6 is a section view of a vortex tube of the downhole laser assembly, in accordance with an embodiment of the disclosure.

Compressed air supply 86 is injected into compressed air supply port 92 of vortex tube 30. Compressed air supply 86 can be provided from the surface. Compressed air supply 86 can be injected into compressed air supply port 92 in a tangential direction. Compressed air supply 86 enters swirl chamber 94 that is shaped to accelerate compressed air supply 86 into a vortex flow pattern. Within the vortex flow pattern, the hotter air will move to the outer diameter of the vortex and the colder air will move towards a center of the vortex. Fluid within the vortex flow pattern moves in a direction towards control valve 96. Control valve 96 is a conical shaped nozzle that allows only an outer diameter of the vortex flow pattern to exit hot air outlet 36. In this way, hot air stream 88 will exit hot air outlet 36. Hot air stream 88 can be directed in a direction away from laser generation unit 24 with by hot air outlet 36. Hot air stream 88 can be released back to the surface or can be released uphole of downhole laser assembly within subterranean well 10 to be utilized as a heat sources, such as for removing condensate banking, asphalted deposits, or for other wellbore cleaning applications.

At control valve 96, the central portion of the vortex flow pattern will be forced to change directions and head towards cold air outlet 38. Because hot air stream 88 has been separated from the vortex flow pattern and exited through hot air outlet 36, the remaining fluid of the vortex flow pattern will be cold air stream 90 that exits cold air outlet 38. Cold air stream 90 can directed over laser generation unit 24 with cold air outlet 38.

By adjusting the flow rate of compressed air supply 86 and control valve 96, the operation of vortex tube 30 can be regulated to control the cooling of downhole laser assembly 22. In an example embodiment, the flow rate of compressed air supply 86 and control valve 96 are controlled to maintain the temperature of downhole laser assembly in a range of 18-23° C. or in an alternate embodiment, to be no more than 21° C. In an example embodiment, when cold air stream 90 is about 10% of the fluid flow through vortex tube 30, a maximum temperature drop can be achieved. As an example at 140 pounds per square inch gauge, a temperature drop of up to 100° C. can be achieved at cold air outlet 38, which can assist in cooling down downhole laser assembly 22.

In the example embodiments of FIGS. 1-2, vortex tube 30 is shown located at an uphole end of laser housing 50. In alternate embodiments, vortex tube 30 can be located within laser housing 50, downhole of laser housing 50, at another location within subterranean well 10, or at the surface 12.

In general, the construction materials of downhole laser assembly 22 can be of any type of material that are resistant to the high temperatures, pressures, and vibrations experienced within subterranean well 10 and that protects the system from fluids, dust, and debris. One of ordinary skill in the art will be familiar with suitable materials. In example embodiments, downhole laser assembly 22 can withstand conditions of a subterranean well that is up to 30,000 feet long, with temperatures up to 200° C., and with pressure of up to 15,000 pounds per square inch.

In an example of operation, downhole laser assembly 22 can be used for penetrating subterranean formation 14. Raw laser beam 48 can be generated with laser generation unit 24 that is located within subterranean well 10. Raw laser beam 48 can be focused, collimated, split, and redirected to form resulting laser beam 84 (as shown in FIGS. 1, 2, 4, and 5) that is used to penetrate subterranean formation 14. Vortex tube 30 can be used to cool downhole laser assembly 22. Compressed air supply 86 is provided to compressed air supply port 92 of vortex tube 30. Vortex tube 30 can direct hot air stream 88 in a direction away from laser generation unit 24 and can direct cold air stream 90 over laser generation unit 24.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A downhole laser assembly for penetrating a subterranean formation, the downhole laser assembly including: a laser generation unit located within a laser housing within a subterranean well; and a vortex tube, the vortex tube being located at the laser housing within the subterranean well below an earth's surface and having: a compressed aft supply port in fluid communication with a compressed air supply at an earth's surface; a hot air outlet oriented to exhaust a hot air stream in a direction away from the laser generation unit; and a cold aft outlet oriented to direct a cold aft stream over the laser generation unit, where the laser generation unit further at a first end of an active medium and an output coupler mirror located at a second end of the active medium.

2. The downhole laser assembly of claim 1, where the vortex tube further includes a swirl chamber shaped to accelerate a compressed air supply into a vortex flow pattern.

3. The downhole laser assembly of claim 1, where the laser generation unit includes an excitation mechanism positioned to excite the active medium.

4. The downhole laser assembly of claim 1, where the reflectance mirror is located uphole from the output coupler mirror.

5. The downhole laser assembly of claim 1, further including a laser manipulator having a laser collimator, the laser manipulator positioned to receive a raw laser beam from the laser generation unit through the laser collimator to produce a collimated laser beam.

6. The downhole laser assembly of claim 5, where the laser manipulator further includes a beam splitter positioned to split the collimated laser beam.

7. The downhole laser assembly of claim 5, where the laser manipulator further includes:
   a beam redirector positioned in a path of the collimated laser beam, the beam redirector operable to change the direction of the collimated laser beam, producing a redirected laser beam; and
   a rotational system positioned to rotate the redirected laser beam around an axis of the collimated laser beam.

8. A method for penetrating a subterranean formation with a downhole laser assembly, the method including: generating a raw laser beam with a laser generation unit located within a laser housing within a subterranean well; providing a compressed aft supply to a compressed aft supply port of a vortex tube, where the compressed aft supply is located at an earth's surface, the vortex tube being located at the laser housing within the subterranean well below an earth's surface; exhausting a hot aft stream in a direction away from the laser generation unit with a hot air outlet the vortex tube; and directing a cold aft stream over the laser generation unit with a cold aft outlet of the vortex tube, where generating the raw laser beam includes reflecting a located at a first end of an active medium and an output coupler mirror located at a second end of the active medium.

9. The method of claim 8, further including accelerating the compressed air supply into a vortex flow pattern with a swirl chamber of the vortex tube.

10. The method of claim 8, where generating the raw laser beam includes exciting the active medium of the laser generation unit with an excitation mechanism of the laser generation unit.

11. The method of claim 8, where the reflectance mirror is located uphole from the output coupler mirror.

12. The method of claim 8, further including producing a collimated laser beam with a laser manipulator having a laser collimator, the laser manipulator positioned to receive the raw laser beam from the laser generation unit through the laser collimator.

13. The method of claim 12, further including splitting the collimated laser beam with a beam splitter of the laser manipulator.

14. The method of claim 12, where the method further includes:
   producing a redirected laser beam by changing the direction of the collimated laser beam with a beam redirector of the laser manipulator positioned in a path of the collimated laser beam; and
   rotating the redirected laser beam around an axis of the collimated laser beam with a rotational system of the laser manipulator.

* * * * *

UNITED STATES PATENT AND TRADEMARK OFFICE
CERTIFICATE OF CORRECTION

PATENT NO.         : 10,968,704 B2
APPLICATION NO.    : 15/902702
DATED              : April 6, 2021
INVENTOR(S)        : Sameeh Issa Batarseh and Mohamed Nabil Noui-Mehidi Page 1 of 2

It is certified that error appears in the above-identified patent and that said Letters Patent is hereby corrected as shown below:

In the Claims

In Claim 1, Column 8, Line 59, reads:
"below an earth's surface and having: a compressed aft"
It should read:
--below an earth's surface and having: a compressed air--;

In Claim 1, Column 8, Line 63, reads:
"generation unit; and a cold aft outlet oriented to direct a cold"
It should read:
--generation unit; and a cold air outlet oriented to direct a cold--;

In Claim 1, Column 8, Line 64, reads:
"aft stream over the laser generation unit, where the laser"
It should read:
--air stream over the laser generation unit, where the laser--;

In Claim 1, Column 8, Line 65, reads:
"generation unit further at a first end of an active medium and"
It should read:
--generation unit further includes an optical resonator, the optical resonator including a reflectance mirror located at a first end of an active medium and--;

In Claim 8, Column 9, Line 31, reads:
"a compressed aft supply to a compressed aft supply port of"
It should read:
 --a compressed air supply to a compressed air supply port of--;

In Claim 8, Column 9, Line 32, reads:
"a vortex tube, where the compressed aft supply is located at"

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

It should read:
--a vortex tube, where the compressed air supply is located at--;

In Claim 8, Column 10, Line 1, reads:
"surface; exhausting a hot aft stream in a direction away from"
It should read:
--surface; exhausting a hot air stream in a direction away from--;

In Claim 8, Column 10, Line 3, reads:
"and directing a cold aft stream over the laser generation unit"
It should read:
--and directing a cold air stream over the laser generation unit--;

In Claim 8, Column 10, Line 4, reads:
"with a cold aft outlet of the vortex tube, where generating the"
It should read:
--with a cold air outlet of the vortex tube, where generating the--; and In Claim 8, Column 10, Line 5, reads:
"raw laser beam includes reflecting a located at a first end of"
It should read:
--raw laser beam includes reflecting a laser light with an optical resonator, the optical resonator including a reflectance mirror located at a first end of--.